(12) United States Patent
Ries et al.

(10) Patent No.: US 9,470,193 B2
(45) Date of Patent: Oct. 18, 2016

(54) SYSTEM AND METHOD FOR FILTERING FUEL WITHIN FUEL TANK

(71) Applicant: Caterpillar Inc., Peoria, IL (US)

(72) Inventors: Jeffrey R. Ries, Metamora, IL (US); Christopher L. Armstrong, Washington, IL (US); John R. Jones, Creve Coeur, IL (US); Daniel R. Ibrahim, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 812 days.

(21) Appl. No.: 13/849,197

(22) Filed: Mar. 22, 2013

(65) Prior Publication Data

US 2014/0284286 A1    Sep. 25, 2014

(51) Int. Cl.
F02M 37/22    (2006.01)
B01D 35/027   (2006.01)
F02M 37/00    (2006.01)

(52) U.S. Cl.
CPC .......... *F02M 37/22* (2013.01); *B01D 35/0276* (2013.01); *F02M 37/0076* (2013.01); *F02M 37/0052* (2013.01); *F02M 2037/228* (2013.01)

(58) Field of Classification Search
None
See application file for complete search history.

(56) References Cited

U.S. PATENT DOCUMENTS

| | | | | |
|---|---|---|---|---|
| 1,058,133 A * | 4/1913 | Yourtree | ............ | B01D 36/001 210/313 |
| 1,072,371 A * | 9/1913 | Stone | ............ | B60K 15/06 137/577 |
| 1,113,683 A * | 10/1914 | Pfahler | ............ | B01D 36/001 210/172.2 |
| 1,191,741 A * | 7/1916 | Scull | ............ | B01D 35/0273 184/6.24 |
| 1,394,011 A * | 10/1921 | Hills | ............ | B01D 35/02 210/172.4 |
| 2,261,915 A * | 11/1941 | Korte | ............ | F02M 37/10 310/242 |
| 2,933,188 A * | 4/1960 | Jacula | ............ | B01D 35/027 210/172.3 |
| 3,108,065 A * | 10/1963 | McMichael | ............ | B01D 35/0273 210/172.3 |
| 3,272,336 A * | 9/1966 | Humbert, Jr. | ............ | B01D 21/0012 210/132 |
| 3,826,372 A * | 7/1974 | Bell | ............ | B01D 35/0273 210/172.4 |
| 3,833,124 A * | 9/1974 | Sugiyama | ............ | B01D 29/15 210/460 |
| 4,354,521 A * | 10/1982 | Harde | ............ | B60K 15/077 137/571 |
| 4,397,333 A * | 8/1983 | Liba | ............ | B60K 15/077 123/514 |
| 4,503,885 A * | 3/1985 | Hall | ............ | B60K 15/077 123/514 |
| 4,618,422 A * | 10/1986 | Sasaki | ............ | B01D 29/15 210/172.3 |
| 4,707,165 A * | 11/1987 | Tauber | ............ | B01D 19/0057 210/108 |
| 4,853,125 A * | 8/1989 | Hanabusa | ............ | B01D 29/23 210/172.2 |
| 5,049,263 A * | 9/1991 | Hoffman | ............ | B01D 29/27 210/452 |

(Continued)

*Primary Examiner* — Robert Popovics
(74) *Attorney, Agent, or Firm* — Miller, Matthias & Hull LLP

(57) ABSTRACT

A system and method for filtering fuel using a fuel filtration system are disclosed. The fuel filtration system may include a fuel filter, a siphon mechanism and a filter shaft. A first end of the filter shaft may be connected to the fuel filter and a second end of the filter shaft may be connected to the siphon mechanism, each of the fuel filter, the siphon mechanism and the filter shaft may be positioned within a fuel tank. Fuel within the fuel tank may be filtered using the fuel filtration system by a siphon action.

3 Claims, 5 Drawing Sheets

(56) References Cited

U.S. PATENT DOCUMENTS

| | | | | |
|---|---|---|---|---|
| 5,085,768 | A * | 2/1992 | Murakami | B03C 1/286 123/198 C |
| 5,312,545 | A * | 5/1994 | Starin | B01D 35/027 210/172.6 |
| 5,776,341 | A * | 7/1998 | Barnard | B01D 29/114 210/306 |
| 5,916,442 | A * | 6/1999 | Goodrich | B01D 17/0208 210/305 |
| 5,924,445 | A * | 7/1999 | Ambrose | B01D 29/213 137/549 |
| 6,203,698 | B1 * | 3/2001 | Goodrich | B01D 17/0208 210/305 |
| 6,241,883 | B1 * | 6/2001 | Noda | B01D 35/027 123/509 |
| 6,283,731 | B1 * | 9/2001 | Yoshioka | B01D 35/0273 123/509 |
| 6,328,889 | B1 * | 12/2001 | Bradford | B01D 29/21 210/308 |
| 6,505,644 | B2 * | 1/2003 | Coha | F02M 37/0094 123/514 |
| 6,540,909 | B2 * | 4/2003 | Smith | B01D 29/114 210/130 |
| 6,540,926 | B2 * | 4/2003 | Goodrich | B01D 17/0208 210/305 |
| 6,610,198 | B1 * | 8/2003 | Jiang | B01D 35/143 116/227 |
| 6,641,742 | B2 * | 11/2003 | Prater | B01D 35/143 116/268 |
| 6,758,980 | B2 * | 7/2004 | Prater | B01D 35/143 116/268 |
| 6,907,899 | B2 * | 6/2005 | Yu | B60K 15/03 123/509 |
| 7,059,305 | B2 * | 6/2006 | Knaggs | B60K 15/03519 123/509 |
| 7,069,913 | B1 * | 7/2006 | Crary | F02M 37/0052 123/509 |
| 7,134,568 | B2 * | 11/2006 | Moriyama | B60K 15/077 210/251 |
| 7,429,322 | B2 * | 9/2008 | Fujita | B01D 17/00 210/172.4 |
| 7,901,572 | B2 * | 3/2011 | Sato | B01D 35/0273 210/172.4 |
| 7,964,096 | B2 * | 6/2011 | Kimisawa | F02M 37/025 123/509 |
| 8,029,667 | B2 * | 10/2011 | Santinon | B60K 15/04 210/172.6 |
| 8,137,546 | B2 * | 3/2012 | Ogose | B01D 35/0273 210/172.4 |
| 8,173,013 | B2 * | 5/2012 | Sato | B01D 35/0273 210/172.4 |
| 8,277,655 | B2 * | 10/2012 | Wieczorek | B01D 29/15 210/304 |
| 8,282,819 | B2 * | 10/2012 | Parra Navarrete | B01D 35/18 210/149 |
| 8,372,278 | B1 * | 2/2013 | Nguyen | B01D 35/0273 123/196 A |
| 8,496,821 | B2 * | 7/2013 | Ringenberger | B01D 29/111 210/232 |
| 8,641,896 | B2 * | 2/2014 | Remacha | B01D 35/18 210/184 |
| 8,715,497 | B2 * | 5/2014 | Schnipke | B01D 35/0273 210/172.2 |
| 8,739,821 | B2 * | 6/2014 | Murabayashi | B60K 15/077 123/509 |
| 8,936,008 | B2 * | 1/2015 | Powell | F02M 37/103 123/495 |
| 8,944,268 | B2 * | 2/2015 | Murabayashi | B60K 15/077 123/509 |
| 8,955,545 | B2 * | 2/2015 | Murabayashi | F02M 37/0094 123/514 |
| 9,079,129 | B2 * | 7/2015 | Smith | B01D 29/114 |
| 9,080,537 | B2 * | 7/2015 | Choi | F02M 37/106 |
| 9,248,390 | B2 * | 2/2016 | Hudgens | B01D 29/56 |
| 2002/0083983 | A1 * | 7/2002 | Coha | F02M 37/0094 137/565.22 |
| 2002/0125178 | A1 * | 9/2002 | Smith | B01D 29/114 210/90 |
| 2003/0015465 | A1 * | 1/2003 | Fick | B01D 29/111 210/234 |
| 2003/0102268 | A1 * | 6/2003 | Prater | B01D 35/143 210/741 |
| 2004/0020871 | A1 * | 2/2004 | Hampton | B01D 17/00 210/799 |
| 2004/0251194 | A1 * | 12/2004 | Brzozowski | B01D 35/0273 210/416.4 |
| 2005/0023201 | A1 * | 2/2005 | Sato | B01D 35/0273 210/172.4 |
| 2005/0109685 | A1 * | 5/2005 | Fujita | B01D 17/00 210/172.2 |
| 2006/0016741 | A1 * | 1/2006 | Moriyama | B60K 15/077 210/172.3 |
| 2006/0283815 | A1 * | 12/2006 | Wieczorek | B01D 29/15 210/791 |
| 2011/0290793 | A1 * | 12/2011 | Murabayashi | B60K 15/077 220/4.14 |
| 2012/0118401 | A1 * | 5/2012 | Murabayashi | B60K 15/077 137/123 |
| 2012/0312759 | A1 * | 12/2012 | Ries | B01D 35/0276 210/806 |
| 2013/0193083 | A1 * | 8/2013 | Kamp | B01D 35/30 210/767 |
| 2014/0230315 | A1 * | 8/2014 | Ries | B01D 35/0276 44/300 |
| 2014/0231366 | A1 * | 8/2014 | Ries | B01D 35/0276 210/806 |
| 2014/0284286 | A1 * | 9/2014 | Ries | F02M 37/22 210/808 |
| 2015/0198071 | A1 * | 7/2015 | Hudgens | B01D 29/56 210/805 |

* cited by examiner

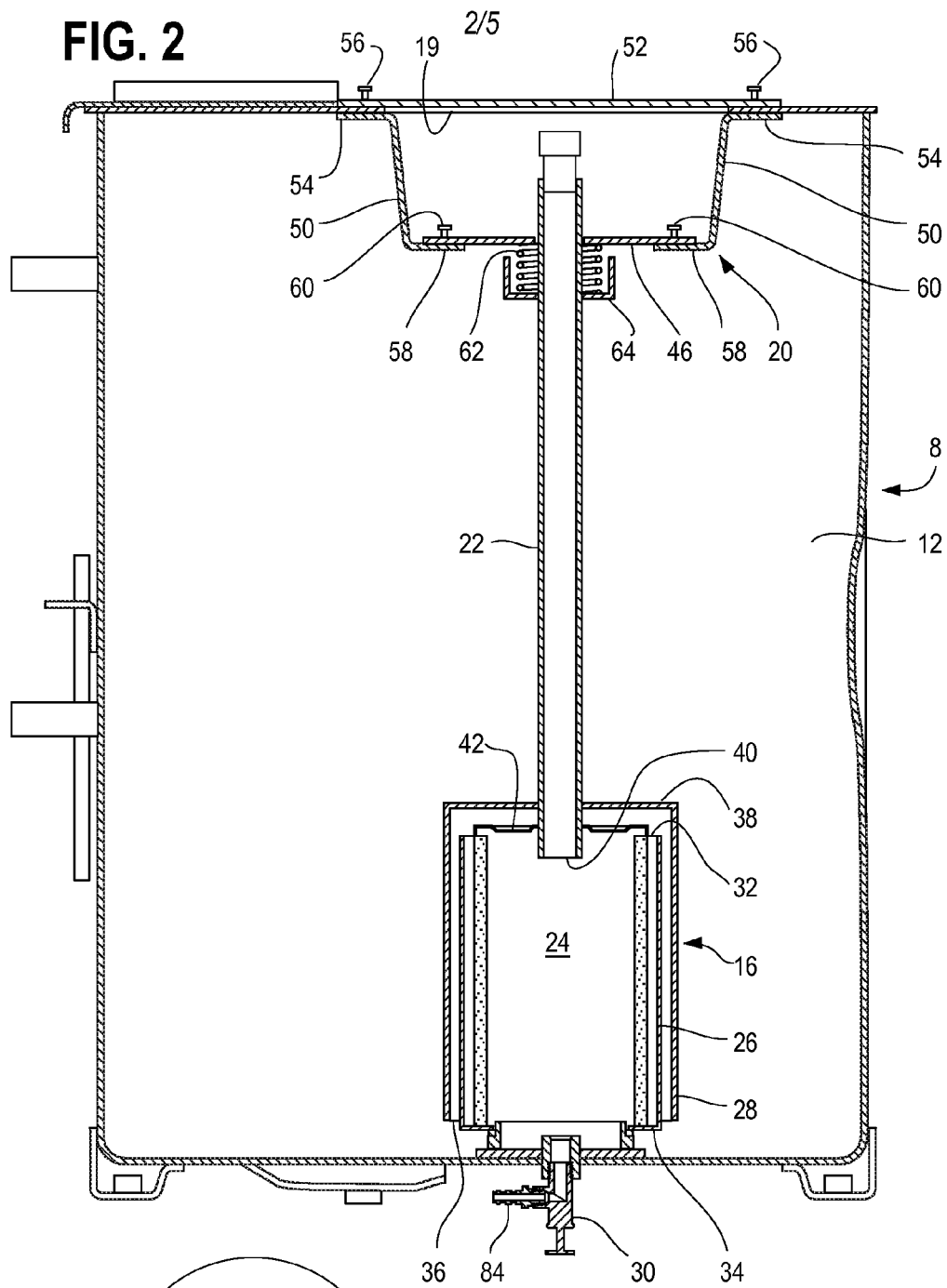
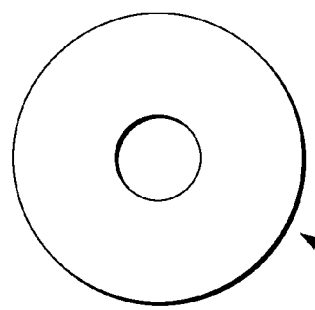
FIG. 2
FIG. 3

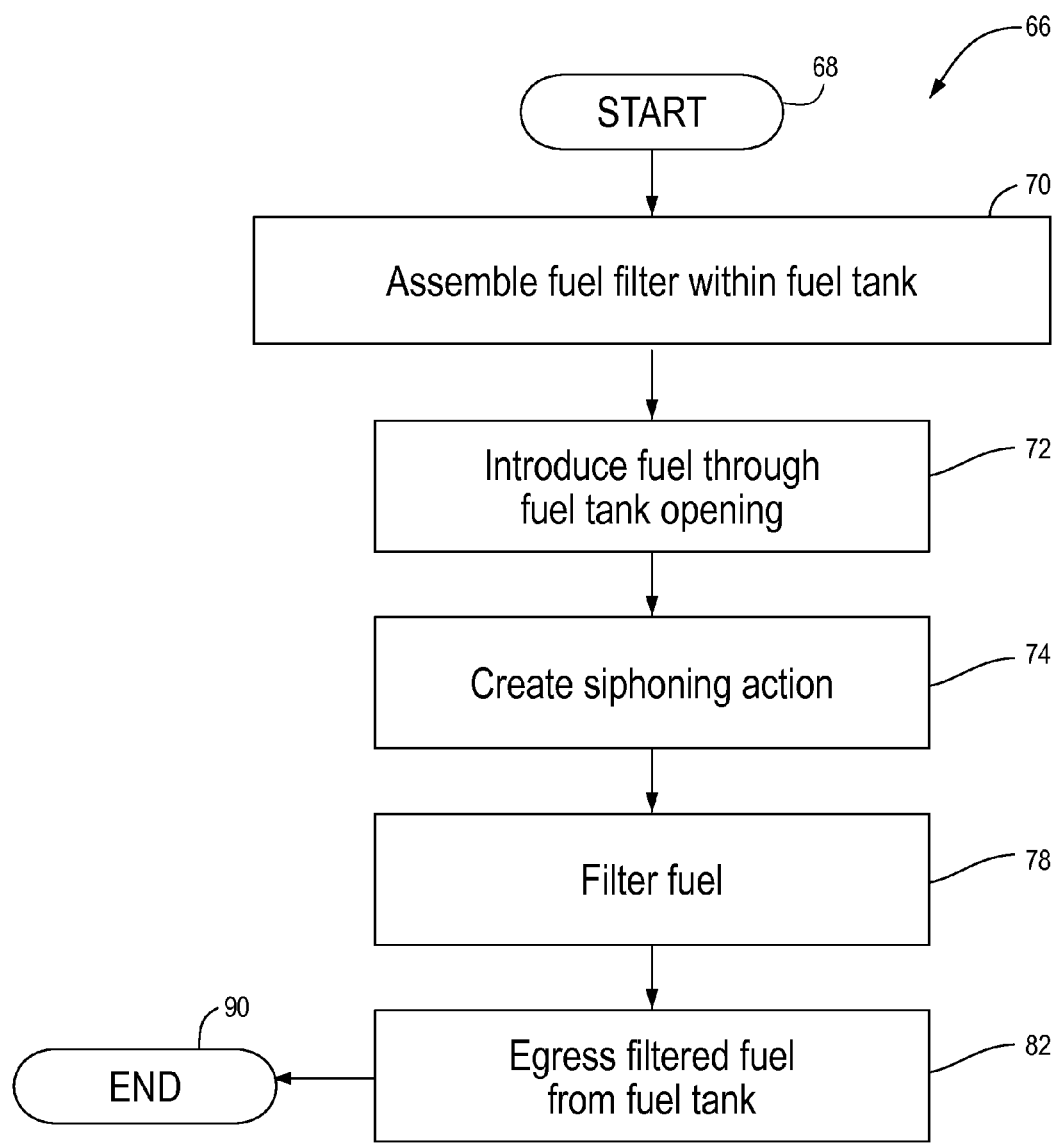

SYSTEM AND METHOD FOR FILTERING FUEL WITHIN FUEL TANK

TECHNICAL FIELD

The present disclosure relates to fuel tanks and, more particularly, relates to fuel filtration systems employed in fuel tanks for cleaning fuel therein.

BACKGROUND

Fuel system contamination can cause serious problems in any engine. Modern high-performance, low-emission models are especially vulnerable to contaminants. Generally speaking, fuel contaminants can be described as small to microscopic particles suspended in any fuel that are typically measured in units called microns. One micron is equivalent to one-millionth of a meter. Various types of contaminants can be found in fuel. For example, dirt and dust can be present, which can cause fungi growth and cloudiness. Rust can accumulate in fuel flowing through rusted hoses and fuel lines corroding or clogging components, such as, injectors and control valves of an engine. Excessive water in fuel can cause algae formation while certain extraneous particulates can affect fuel stability.

Such contaminants in fuel are common and can cause premature engine wear, reduce component life, reduce performance and even cause sudden engine failure. As critical components wear prematurely, engine power drops off, fuel consumption rises, emissions increase and the odds of a costly breakdown rise dramatically. In at least some occasions, contaminants can be as abrasive as the materials used to machine parts in the manufacturing process of an engine. Accordingly, alleviating or possibly even completely eliminating contamination from fuel before fuel reaches the engine is highly desirable. These issues may be particularly acute in remote locales where fuel is stored on construction sites to power construction equipment or in nations or regions where fuel quality guidelines are either not stringent or loosely enforced.

While the effects of dirty fuel can be minimized by using proper storage, handling, maintenance and service processes, such methods are often not followed, or even if followed may not be sufficient and may need to be augmented by other procedures. Techniques for minimizing and/or removing contaminants in fuel have been proposed in the past. One technique employs specialized external pumps for cleaning and filtering fuel before fuel even enters a fuel tank for combustion and/or storage. Although this technique may be effective in removing some contaminants, not all contaminants are removed, which may nonetheless find their way into the fuel tank. Furthermore, more contaminants may accumulate in the fuel from the point of filtration up to the point of the fuel entering the fuel tank. Contaminants may even accumulate in the fuel stored within the fuel tank, due to corrosion of the fuel tank walls and other components thereof, or contaminants entering the fuel tank when the fuel tank cap is opened. Such contaminants may find their way through the fuel line into the engine and may cause at least some of the problems mentioned above.

Other techniques employ fuel filters within the fuel tank. Although such fuel filters may alleviate at least some of the aforementioned problems, these fuel filters are usually not effective when the level of the fuel within the fuel tank reaches (e.g., empties) to a certain level. Unfiltered fuel from the bottom of the fuel tank may therefore find its way into the engine through the fuel line, creating some or all of the aforementioned problems.

Accordingly, it would be advantageous if an improved fuel filtration system that removed contaminants before fuel reached the engine were developed. It would be additionally beneficial if such a fuel filtration system could effectively filter fuel irrespective of the level of fuel within the fuel tank.

SUMMARY

In accordance with one aspect of the present disclosure, a fuel filtration system is disclosed. The fuel filtration system may include a fuel filter, a siphon mechanism and a filter shaft having a first end and a second end. The first end of the filter shaft may be connected to the fuel filter and the second end of the filter shaft may be connected to the siphon mechanism, each of the fuel filter, the siphon mechanism and the filter shaft may be positioned within a fuel tank.

In accordance with another aspect of the present disclosure, a method of filtering fuel is disclosed. The method may include providing a fuel tank having a fuel filtration system, the fuel filtration system may have a fuel filter, a siphon mechanism and a filter shaft. The method may also include assembling the fuel filtration system within the fuel tank, introducing fuel desired to be filtered into the fuel tank and filtering the introduced fuel by creating a siphon action.

In accordance with yet another aspect of the present disclosure, a fuel system is disclosed. The fuel system may include a fuel tank having a filter opening and a fuel filtration system positioned within the fuel tank, substantially below the filter opening. The fuel filtration system may include a fuel filter, a siphon mechanism connected to the filter opening and a filter shaft connected at one end to the siphon mechanism and connected to the fuel filter at another end thereof.

BRIEF DESCRIPTION OF THE DRAWINGS

FIG. 2 is a schematic view in cut-away, taken along lines 2-2 of FIG. 1, of a portion of the fuel tank showing the fuel filtration system in greater detail;

FIG. 3 shows an exemplary top plate for use in conjunction with the fuel filtration system of FIG. 2;

FIG. 6 is a flowchart showing a method of filtering fuel using the fuel filtration system of FIGS. 2 and 4.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents falling within the spirit and scope of the present disclosure.

DETAILED DESCRIPTION

A fuel system having a fuel tank and a fuel filter for filtering fuel are disclosed. While not exclusive, such a fuel system may be effectively employed in various machines used in construction, earth moving, and agriculture fields, including but not limited to track-type tractors, excavators, graders, rollers, off-highway trucks, pipe layers and loaders.

Figure 1:
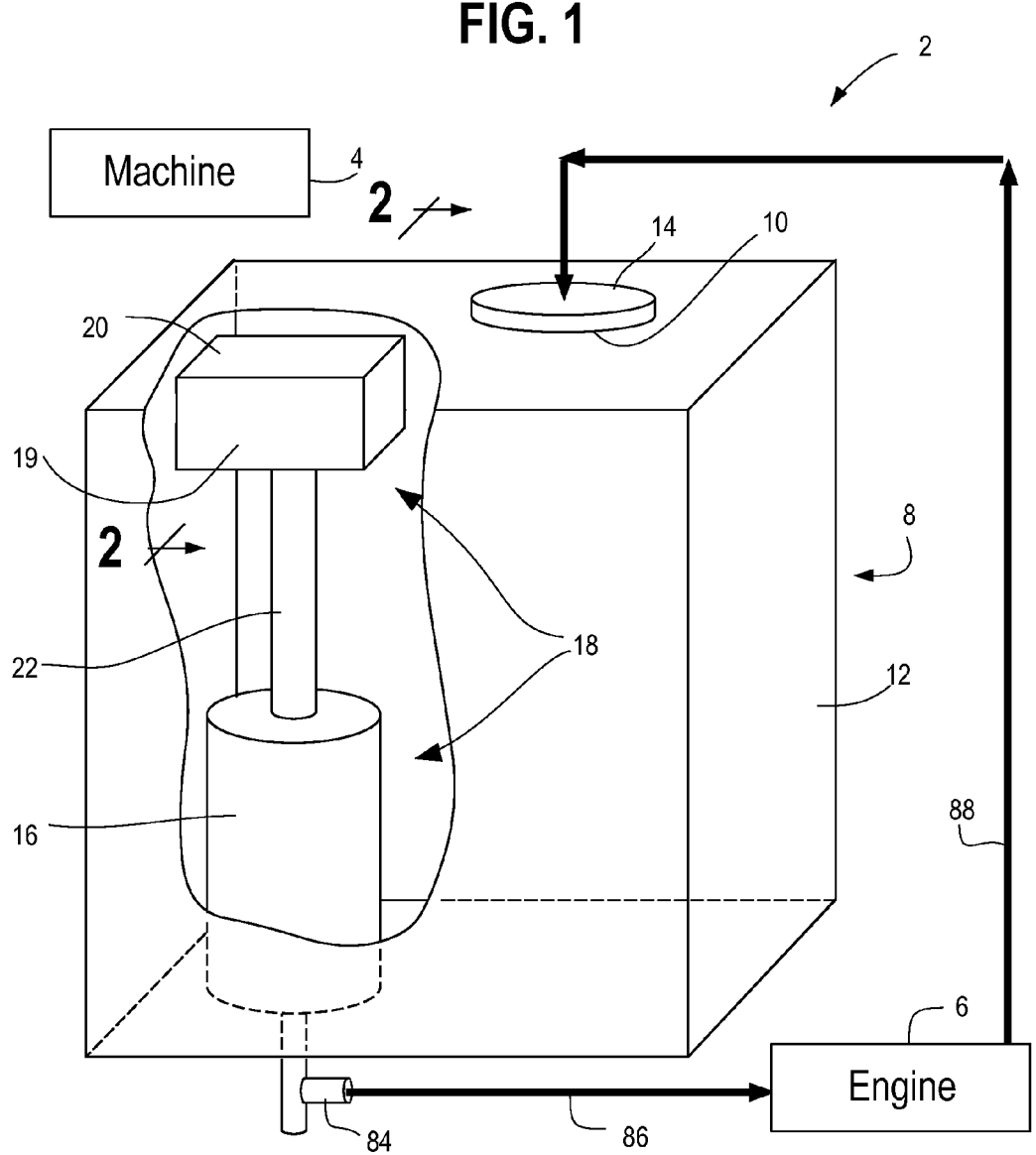
FIG. 1 is a schematic view of a machine having a fuel tank employing a fuel filtration system therein, in accordance with at least some embodiments of the present disclosure.

Referring now to FIG. 1, a fuel system 2 is shown, in accordance with at least some embodiments of the present disclosure. As shown, the fuel system 2 may be part of a machine 4 having an engine 6 and a fuel tank 8. The machine 4 may be any of a variety of machines, such as those mentioned above, while the engine 6 may be any of an internal combustion engine, diesel engine, hybrid engine, or the like, that are commonly employed in machines, such as the machine 4.

With respect to the fuel tank 8, while all of the components of the fuel tank 8 have not been shown in FIG. 1, a typical fuel tank of the type that may be employed with the machine 4 may include a fuel tank opening 10 for filling (through a fuel nozzle, not shown) and storing fuel within a volume of a fuel tank body 12. The fuel tank opening 10 may be covered and protected by a fuel tank cap 14. The fuel tank 8 may additionally employ a fuel filter (or filter assembly) 16 as part of a fuel filtration system 18, described in greater detail further below, for removing contaminants from the fuel within the fuel tank 8. The fuel filtration system 18 may be positioned within the fuel tank 8 beneath a filter opening 19 on the fuel tank.

The shape, size and material of the fuel tank 8 may vary depending upon the application of the fuel tank. For example, in one embodiment, the fuel tank 8 may be seven hundred and sixty millimeters (760 mm) long, six hundred and thirty millimeters (630 mm) wide and eight hundred and sixty two millimeters (862 mm) deep, but this is only one example. In other embodiments, the size of the fuel tank 8 may vary. Relatedly, the shape and material of the fuel tank 8 may vary as well. Moreover, the fuel tank 8 may be a stand-alone structure or, as shown, it may be mounted in or on a machine (e.g., the machine 4). Accordingly, the fuel tank 8 may be representative of in-machine fuel tanks, above-ground or under-ground bulk storage stationary fuel tanks employed on construction sites, tanker trucks in aviation, marine and other commercial transportation fleet re-fueling, etc. The fuel tank 8, whether in-machine or bulk storage, may be employed for storing fuels, such as, gasoline, diesel fuel, kerosene or any other type of liquid fuel that may require filtration.

Relatedly, the configuration and, particularly, the shape and size of the fuel tank opening 10 and the fuel tank cap 14, as well as the manner of securing the fuel tank cap to the fuel tank opening may vary depending upon several factors, such as, the type of the fuel tank 8, the type of fuel stored within the fuel tank, the shape and size of the nozzle employed for filling fuel through the fuel tank opening, the shape and size of the machine 4 using the fuel tank, etc. For example, in some embodiments, the fuel tank opening 10 may be provided with threads on a neck portion thereof, which may be designed to mate and lock with corresponding threads on the fuel tank cap 14. In other embodiments, the fuel tank opening 10 may have friction nubs and the fuel tank cap 14 may be frictionally snapped to the fuel tank opening. In alternate embodiments, other commonly employed mechanisms for securing the fuel tank cap 14 to the fuel tank opening 10 may be employed.

In addition to the fuel tank opening 10, the fuel tank cap 14 and the filter opening 19, the fuel tank 8 and particularly, the fuel tank body 12 of the fuel tank may be equipped with several other components, such as, a fuel sensor for sensing the level of the fuel within the fuel tank body 12, as well as various vents, gauges, hose assemblies, nozzles etc. Although these components are not shown and/or fully described, they are contemplated in combination or conjunction with the fuel tank 8 and are considered within the scope of the present disclosure. Moreover, it will also be understood that portions of the fuel tank body 12 have been shown as transparent merely for explanation purposes. Although the fuel tank body (or portions thereof) 12 may indeed be transparent, this need not and likely is not the case. In at least some embodiments, the fuel tank body 12 (or portions thereof) may be opaque or translucent.

Figure 4:
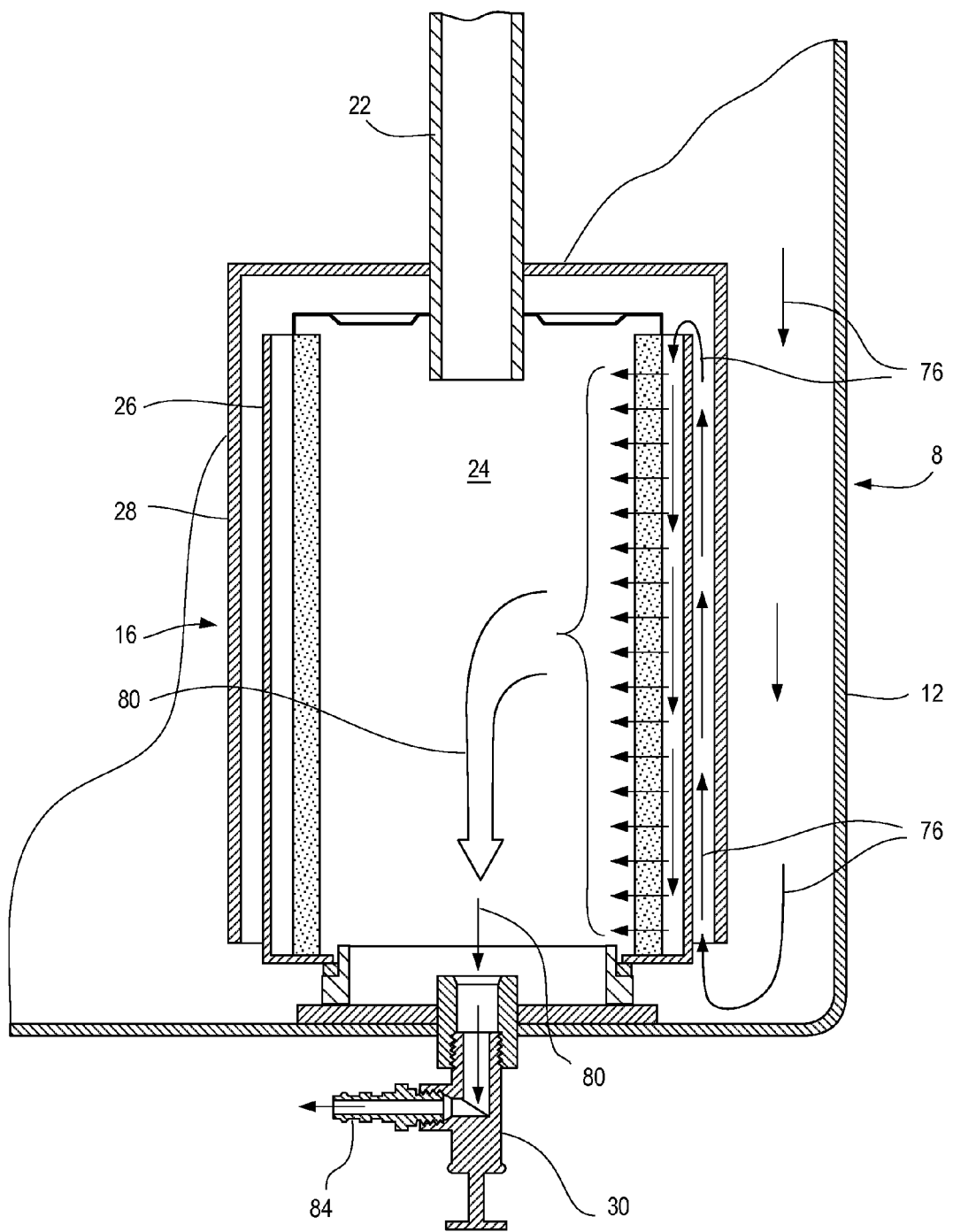
FIG. 4 shows a portion of the fuel filtration system of FIG. 2 in further detail.

Referring now to FIG. 2 in conjunction with FIGS. 3 and 4, the fuel filtration system 18 employed within the fuel tank 8 is shown, in accordance with at least some embodiments of the present disclosure. FIG. 2 in particular is a cut-away front view of a portion of the fuel tank 8, taken along line 2-2 of FIG. 1, showing the fuel filtration system 18 in greater detail, while FIG. 3 shows an exemplary component, described in greater detail below, for use within the fuel filtration system. Similarly, FIG. 4 shows additional details and illustrates the functioning of the fuel filtration system of FIG. 2. In at least some embodiments, the fuel filtration system 18 may be a siphon filtration system having the fuel assembly or fuel filter 16, a siphon mechanism 20 and a filter shaft 22 connecting the fuel filter and the siphon mechanism. Each of the fuel filter 16, the siphon mechanism 20 and the filter shaft 22 are described in greater detail below.

With specific reference to the fuel filter 16, it may be a cylindrical filter having a central filter media or filter cartridge 24 surrounded by an inner bucket 26 and an outer bucket 28. The filter cartridge 24 may be a high efficiency cellulosic or synthetic filter media to filter and clean particles of dust, debris, and other contaminants from the fuel within the fuel tank 8. In at least some embodiments, the fuel filter 16 may have an outer pleated surface and radial beading. In other embodiments and, as shown, the fuel filter 16 may not have a pleated surface and/or any radial beading. Additionally, depending upon the size and amount of the contaminants desired to be filtered, the rating, as well as the size of the filter cartridge 24 employed within the fuel filter 16 may vary. For example, in some embodiments, the fuel filter 16 may be a 99.5% efficiency filter, while in other embodiments, the rating of the fuel filter may vary.

Furthermore, in at least some embodiments, the fuel filter 16 may be constructed to impart thereto a water separation capability, such that any water from the fuel that comes in contact with the fuel filter may coalesce on the walls of the fuel filter and drip down. A water drain 30 may be employed at the bottom of the fuel filter 16 to drain away the collected water. In other embodiments, a water separator (not shown) separate from the fuel filter 16 to remove water from the fuel may be employed in conjunction or combination with the fuel filter. It will also be understood that the water drain 30 may also be employed for draining any residual fuel from the fuel tank 8 (e.g., when emptying the fuel tank). Moreover, the fuel filter 16 may either be a disposable fuel filter that may be occasionally replaced for continual filtration or, alternatively, the fuel filter may be a reusable fuel filter, such as a centrifugal filter, that may be occasionally removed, cleaned and installed back into position for filtration.

With respect to the inner bucket 26, it may wrap around a substantial portion of the filter cartridge 24 and may have an open top end 32 and a closed bottom end 34. The inner bucket 26 may be employed for trapping any filtered debris within the fuel filter 16 as the fuel filter is pulled away from the fuel tank 8 for cleaning and/or replacement. Similar to the filter cartridge 24, the inner bucket 26 may also be disposable or reusable. Furthermore, the inner bucket 26 may be connected to the filter cartridge 24 by any of a variety of mechanisms, such as, a threaded interface, a friction fit, adhesives, welding or possibly a magnetic interface.

Relatedly, the outer bucket 28 may encapsulate both, the filter cartridge 24 and the inner bucket 26. In contrast to the inner bucket 26, which may have an open top end and a closed bottom end, the outer bucket 28 may have an open bottom end 36 and a closed top end 38. In further contrast to the inner bucket 26, which is connected to the filter cartridge 24, the outer bucket 28 instead may be connected to the filter shaft 22. The outer bucket 28 may be connected to the filter shaft 22 by welding, threading, adhesives, etc. As will be described further below, the outer bucket 28 may be primarily employed for creating and maintaining suction for holding and suctioning fuel within the filter cartridge 24, thereby imparting the siphoning capability to the fuel filtration system 18. To that end, the top end 38 of the outer bucket 28 may extend above the top end 32 of the inner bucket 26 such that any fuel from the outer bucket may easily flow through the top end of the inner bucket into the filter cartridge 24. Both, the inner bucket 26 and the outer bucket 28 may be constructed of any of a variety of materials that are suitable for using within the fuel tank 8, such as any corrosion resistant material. Further, the outer bucket 28 may also be a disposable or a reusable bucket.

The fuel filter 16 may be connected to the siphon mechanism 20 via the filter shaft 22. The filter shaft 22 may be a hollow shaft, a first end 40 of which may extend through a top portion 42 of the filter cartridge 24 and may be welded to the outer bucket 28, as stated above and, a second end 44 of which may extend through a top plate 46 of the siphon mechanism 20, as explained below. The second end 44 of the filter shaft 22 may further receive a check valve 48 (e.g., a ball valve, a one-way check valve, a low-pressure check valve or similar sealing feature). The check valve 48 may be employed for purging air out of the filter shaft 22 to create a suctioning action or force for the fuel within the fuel tank 8 to enter the outer bucket 28 of the fuel filter 16.

With respect to the siphon mechanism 20, as shown in FIG. 2, it may be positioned beneath the filter opening 19. In at least some embodiments, the siphon mechanism 20 may include a pair of support plates 50, one end of each of which may be connected to the top plate 46 and another end of each of which may be connected to a cover plate 52. In that regard, each of the support plates 50 may assume a substantial S-shape, such that a first end 54 of each of the support plates 50 may be bolted by bolts 56 to the cover plate 52. The cover plate 52 may be a plate with an O-ring groove and an O-ring to keep out rain, dust and debris from entering the fuel tank 8. The cover plate 52 may be employed for covering the filter opening 19 and may also be employed for installing and/or removing the fuel filter 16 from the fuel tank 8. A second end 58 of each of the support plates 50 may be bolted by bolts 60 to the top plate 46. Notwithstanding the fact that in the present embodiment, each of the support plates 50 have been bolted to both, the cover plate 52 and the top plate 46, in at least some other embodiments, other mechanisms to secure the support plates to each of the cover plate and the top plate may be employed. The shape of each of the support plates 50 may vary as well in other embodiments.

Furthermore, as shown in FIG. 3, the top plate 46 may be a circular plate with a hole in a center portion thereof (i.e., annular or washer like shape) to receive a spring 62. The spring 62 may be wound about the filter shaft 22 and may extend through the hole of the top plate 46 such that a bottom portion of the spring may rest on a cup 64. The cup 64 may be welded to the filter shaft 22. By virtue of providing the spring 62, any fatigue problems arising due to a rigid connection between the support plates 50 and the top plate 46 may be avoided. In other embodiments, other mechanisms to prevent fatigue within the siphon mechanism 20 may be employed. Furthermore, in at least some embodiments, the filter shaft 22 may extend out of the fuel tank 8 through the filter opening 19 and may be secured to an outer surface of the fuel tank by other mechanisms (other than the siphon mechanism 20) such that the check valve 48 may be accessed without removing the cover plate 52.

Thus, the fuel filtration system 18 may include the fuel filter 16, the siphon mechanism 20 and the filter shaft 22. By virtue of connecting the fuel filter 16 to the siphon mechanism 20 via the filter shaft 22, not only is a siphon functionality for filtering fuel provided, but rather the fuel filter may be held in a steady and stable position within the fuel tank 8. Installing and removing the fuel filter 16 from the fuel tank 8 may also be eased by providing the filter shaft 22. Specifically, when the fuel filter 16 is to be installed within the fuel tank 8, the cover plate 52 may be removed (e.g., by unbolting the bolts 56) and the entire assembly of the siphon mechanism 20, the filter shaft 22 and the fuel filter 16 may be lowered into the fuel tank until the fuel filter is set into position. Relatedly, to remove the fuel filter 16 from the fuel tank 8 for either cleaning or replacement, the cover plate 52 may again be opened (e.g., by unscrewing the bolts 56) and the siphon mechanism 20, the filter shaft 22 and the fuel filter 16 may all be pulled up. It will be understood that as the fuel filter 16 is pulled up, the inner bucket 26 and the outer bucket 28 are pulled along with the filter cartridge 24. Furthermore, the inner bucket 26 captures all of the debris filtered by the filter cartridge 24, such that it is not purged back into the fuel within the fuel tank 8.

Figure 5:
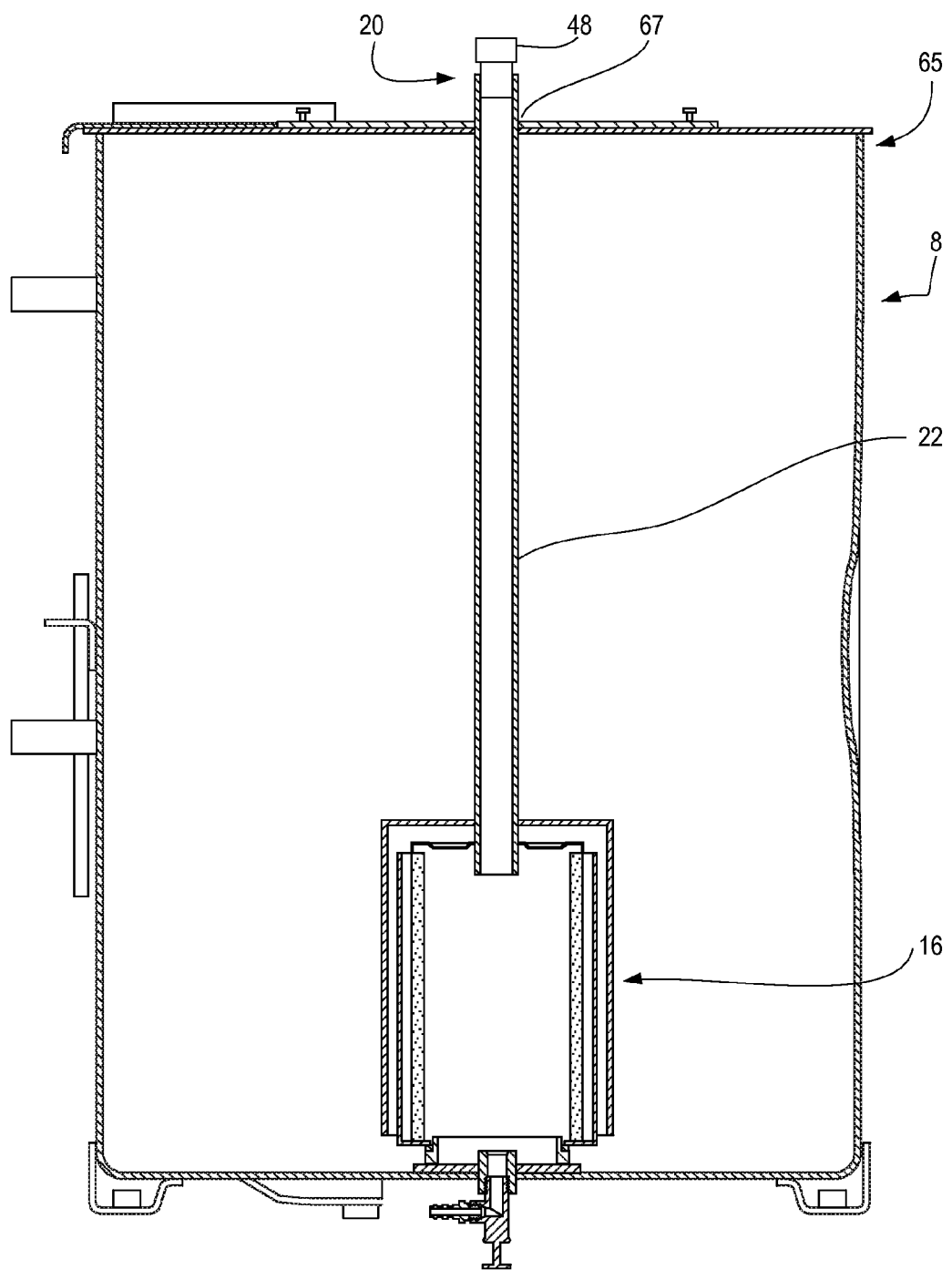
FIG. 5 shows an alternate embodiment of the fuel filtration system of FIG. 1.

Turning now to FIG. 5, an alternate embodiment of the fuel filtration system 65 is shown, in accordance with at least some embodiments of the present disclosure. To the extent that the fuel filtration system 65 is similar to the fuel filtration system 18, only the differences between those fuel filtration systems are described herein. Thus, similar to the fuel filtration system 18, the fuel filtration system 65 may include the fuel filter 16, the siphon mechanism 20 and the filter shaft 22. However, in contrast to the fuel filtration system 18 in which the filter shaft 22 is disposed entirely within the volume of the fuel tank 8, the filter shaft in the fuel filtration system 65 may extend outside the volume of the fuel tank. In further contrast to the fuel filtration system 18, the siphon mechanism 20 in the fuel filtration system 65 may include only the check valve 48 disposed on the second end 44 of the filter shaft 22. The check valve 48 may provide the siphon action in a manner similar to that described above.

In at least some embodiments, the filter shaft 22 may be extended to outside of the volume of the fuel tank 8 through a cut-out 67 in the cover plate 52. Furthermore, in at least some embodiments, the filter shaft 22 may be welded or otherwise connected in some manner to the cover plate 52. By virtue of connecting the filter shaft 22 to the cover plate 52, upon removing the cover plate (e.g., by unbolting the bolts 56), the filter shaft 22 may also be removed from the body of the fuel tank 8 to replace the fuel filter 16 therein. The fuel filtration system 65 functions substantially similarly to the fuel filtration system 18, as described in greater detail below.

Industrial Applicability

In general, a fuel filtration system for filtering fuel within a fuel tank in a fuel system is described above. The fuel filtration system may include a fuel filter connected to a siphon mechanism via a filter shaft. The fuel filter in turn may have a filter cartridge, an inner bucket and an outer bucket for creating a siphoning action, as well as for providing efficient filtering irrespective of the level of fuel within the fuel tank, as described below.

A method 66 of filtering fuel entering the fuel tank 8 is shown with respect to FIG. 6 in conjunction with FIG. 4. After starting at a step 68, the fuel filter 16 may first be assembled within the fuel tank 8 at a step 70. As described above, the fuel filter 16 may be connected to the filter shaft 22, which in turn may be connected to the siphon mechanism 20. The entire assembly of the siphon mechanism 20, the filter shaft 22 and the fuel filter 16 may be lowered through the filter opening 19 into the fuel tank 8. The assembly may be lowered into the fuel tank 8 until the fuel filter 16 is securely positioned on a bottom surface of the fuel tank. Subsequently, the cover plate 52 may cover the filter opening 19 and may be bolted to the support plates 50 by the bolts 56.

After assembling the fuel filter 16 within the fuel tank 8 at the step 70, the fuel desired to be stored (and/or filtered) within the fuel tank is pumped, poured or otherwise introduced through the fuel tank opening 10 at a step 72. Next, at a step 74, a siphon force or action for filtering fuel within the fuel tank 8 is created. Typically, the siphon action will be created automatically by virtue of the check valve 48, such that the fuel flows from the fuel tank 8 through the bottom end 36 of the outer bucket 28 and through the top end 32 of the inner bucket 26 into the filter cartridge 24. The flow of fuel from the fuel tank 8 into the filter cartridge 24 is shown by arrows 76 in FIG. 4. On certain occasions, it may be necessary to open the check valve 48 in order to purge air from the filter shaft 22 to create a siphon force. For example, the check valve 48 may need to removed (and installed back) manually after the fuel tank 8 is tipped letting air into the fuel tank, or if the machine 4 is run with an empty fuel tank or, alternatively, when the fuel tank 8 is filled up with fuel for the very first time.

Employing a siphon action to suction fuel from the fuel tank into the fuel filter 16 and, particularly, into the filter cartridge 24 of the fuel filter provides several advantages. For example, all of the fuel within the fuel tank 8 may be filtered irrespective of the level of fuel within the fuel tank. The life of the filter cartridge 24 may be maximized by creating the siphon action insofar as the entire length of the filter cartridge may be employed for filtering fuel. This is in contrast to conventional fuel filters where once the fuel reaches a certain level within the fuel tank, filtering of that fuel is not facilitated. Thus, only a portion of the fuel filter (e.g., the portion that is below the fuel level) in conventional filtering systems is utilized, thereby requiring frequent fuel filter changes while a portion of the fuel filter is still unused. Additionally, by employing a siphon action, the fuel filter 16 may be made as tall as needed (limited of course by the cup 64 in the embodiment of FIG. 2) to improve or further extend the life of the fuel filter.

Thus, after creating a siphon action at the step 74, the fuel within the fuel tank 8 may be filtered at a step 78. It will be understood that although the steps of creating a siphon action and filtering the fuel have been described as happening sequentially one after another, and there indeed may be a small time lag between the two steps, typically, the siphoning action and the filtering of the fuel occurs simultaneously (or substantially simultaneously). Furthermore, the fuel may be filtered in an outside-in flow path, as shown by arrows 80 in FIG. 4. Thus, the flow of fuel through the fuel filter 16 is uni-directional, that is, from outside the fuel filter to the inside surface thereof. By virtue of filtering the fuel in an outside-in flow path, any debris that may be filtered may be trapped by the inner bucket 26, as well as within the filter cartridge 24. The filtered fuel may then egress the fuel tank 8 at a step 82 via a fuel outlet nozzle 84 formed on a bottom surface of the fuel tank.

In particular, the filtered fuel from the fuel outlet nozzle 84 may flow via a fuel line 86 (See FIG. 1) into the engine 6 for combustion. After combustion in the engine 6, any non-combusted fuel may be returned to the fuel tank 8 via a return fuel line 88 for re-filtration and re-combustion, as outlined above by the steps 74 and 78. In at least some embodiments, the return fuel line 88 may not return fuel back into the fuel tank 8 through the fuel tank opening 10. Rather, a separate opening for returning the fuel from the return fuel line 88 may be provided in other embodiments. The process then ends at a step 90.

It will be understood again that although the steps 72, 74 and 78 of introducing fuel, creating a siphon action and passing fuel through the fuel filter 16, respectively, have been described above as happening one after another, there may not necessarily be a time lag between those steps. Rather, those steps may happen simultaneously such that the fuel may be continuously directed through the fuel tank opening and filtered through the fuel filter 16. As also discussed above, unless air penetrates the fuel tank 8, the siphon action is created automatically. Typically, the check valve 48 prevents the passage of air within the fuel tank 8. However, if air does get into the fuel tank 8, then the siphon action may be created manually by removing and re-positioning the check valve 48 to equilibrate pressure within the fuel tank.

Thus, by virtue of providing a siphon function for filtering fuel within the fuel tank, any incoming fuel may be automatically filtered before storing and/or supplying that fuel for combustion in an engine of a machine or the like. Positioning the siphon mechanism and the fuel filter within the fuel tank advantageously makes the fuel filter invisible to a customer when filling the fuel tank, consumes less space compared to conventional external fuel filters, performs filtering without the requirement of any pumps or other special equipment, are simple to maintain and economical to use. Even when the filter shaft extends to the outside of the fuel tank, the actual filtration system remains within the fuel tank and invisible to the user. Accordingly, the present disclosure provides a high efficiency, durable and inexpensive filtering mechanism for filtering fuel to alleviate (or possibly even completely eliminate) contaminants from the fuel, thereby improving fuel stability as well as increasing the performance and reliability of engines employing the filtered fuel.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A fuel filtration system, comprising;
    a fuel tank having an opening in an upper portion thereof, and an outlet for allowing filtered fuel to exit said fuel tank in a lower portion thereof;
    a cover plate sized to cover and close said opening;
    a siphon mechanism in an upper portion of said fuel tank;

a siphon action fuel filter including:
  a filter cartridge;
  an inner bucket having an open top end and a closed bottom end surrounding and connected to said filter cartridge; and
  an outer bucket having a closed top end and an open bottom end surrounding and spaced from said inner bucket;
a hollow filter shaft having a first open end and a second open end, the first open end being fluidically connected to the fuel filter, placing an interior of the filter cartridge in fluid communication with the interior of the hollow shaft, to permit venting of the filter cartridge, the second open end being attached to said siphon mechanism; and
a check valve affixed at the second open end of said hollow filter shaft for controlling fluid flow therethrough;
wherein, fuel within the fuel tank flows up through an annular space defined between said outer and inner buckets, through said filter cartridge into an interior thereof, with filtered fuel exiting said fuel tank through said outlet, said opening being of sufficient size that it will permit said hollow filter shaft and siphon action fuel filter to be grasped and removably passed therethrough.

2. The fuel filtration system of claim 1, wherein the siphon mechanism includes:
  at least one support plate;
  a top plate connected to the at least one support plate at one end thereof; and
  wherein said cover plate is connected to the at least one support plate at another end thereof.

3. The fuel filtration system of claim 2, further comprising a spring wound around the filter shaft and extending through a hole in the top plate, one end of the spring resting on a cup positioned below the top plate.

* * * * *